(12) United States Patent
Asada

(10) Patent No.: US 6,633,535 B1
(45) Date of Patent: Oct. 14, 2003

(54) REWRITABLE MULTILAYER DISK AND INFORMATION RECORDING/REPRODUCING DEVICE

(75) Inventor: Shin Asada, Neyagawa (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/937,028
(22) PCT Filed: Mar. 23, 2000
(86) PCT No.: PCT/JP00/01797
§ 371 (c)(1), (2), (4) Date: Sep. 19, 2001
(87) PCT Pub. No.: WO00/57410
PCT Pub. Date: Sep. 28, 2000

(30) Foreign Application Priority Data

Mar. 23, 1999 (JP) .............................................. 11-77385

(51) Int. Cl.⁷ .............................. G11B 3/70; G11B 5/84; G11B 7/26; G11B 5/09; G11B 15/52; G11B 19/04; G11B 20/10
(52) U.S. Cl. ...................................... 369/286; 369/47.1
(58) Field of Search .............................. 369/286, 283, 369/278, 272, 44.33, 13.39, 13.4, 13.07, 47.1, 275.1, 47.12; 360/131, 133, 135

(56) References Cited

U.S. PATENT DOCUMENTS

| 5,058,162 A | 10/1991 | Santon et al. ................. 380/25 |
| 5,694,381 A | * 12/1997 | Sako ........................ 369/47.12 |
| 2002/0176341 A1 | * 11/2002 | Ko et al. ................. 369/53.21 |

FOREIGN PATENT DOCUMENTS

| EP | 0 919 929 A1 | 6/1999 |
| EP | 0 965 988 A2 | 12/1999 |
| JP | 05-134863 | 6/1993 |
| JP | 05-173891 | 7/1993 |
| JP | 11-007412 | 12/1999 |
| JP | 2000-036161 | 2/2000 |

OTHER PUBLICATIONS

International Search Report, International Application No. PCT/JP00/01797, dated Jul. 11, 2000.

* cited by examiner

Primary Examiner—Julie Anne Watko
(74) Attorney, Agent, or Firm—Renner, Otto, Boisselle & Sklar (57) ABSTRACT

There is provided a rewritable multilayered disc having a plurality of recording layers. At least one of the plurality of the recording layers has a layer information region for recording layer information which includes recording prohibition information. The recording prohibition information indicates whether or not user data is prohibited from being recorded in a specific recording layer among the plurality of the recording layers.

6 Claims, 8 Drawing Sheets

REWRITABLE MULTILAYER DISK AND INFORMATION RECORDING/REPRODUCING DEVICE

TECHNICAL FIELD

The present invention relates to a rewritable multilayered disc having a write protection (recording/erasing prohibition) function and to an information recording/reproducing device for such a rewritable multilayered disc.

BACKGROUND ART

A floppy disc is known well as one of representative examples of rewritable discs having portability. The floppy disc has a write protection mechanism. A user can use the write protection mechanism to give a write protection to a floppy disc and cancel such write protection.

For example, in the case of selling a floppy disc storing commercial software or in the case of providing someone with a floppy disc storing important data, a write protection is given to the floppy disc. As a result, it is possible to prevent the commercial software or the important data stored in the floppy disc from being erased by mistake.

Whether or not a write protection is given to the floppy disc is identified not by an application program which utilizes a disc drive device, but by firmware which operates the disc drive device.

The rewritable discs having portability are often stored in a cartridge. The principal purpose of this is to protect the disc from external factors (e.g., dust, finger prints, etc.) which may damage the quality of the disc. Conventionally, when the rewritable disc having portability is stored in a cartridge, the write protection mechanism is provided to the cartridge.

However, in the case of a disc which is removable from the cartridge, e.g., a DVD-RAM, the disc removed from the cartridge may not be properly put back in the cartridge. In such a case, the write protection for the disc may not be implemented using the write protection mechanism provided to the cartridge.

The present invention is made in consideration of the problem described above, and an objective thereof is to proved a rewritable multilayered disc having a write protection function and an information recording/reproducing device for the rewritable multilayered disc.

DISCLOSURE OF THE INVENTION

In one aspect of the present invention, there is provided a rewritable multilayered disc having a plurality of recording layers in which at least one of the plurality of the recording layers has a layer information region for recording layer information which includes recording prohibition information, and the recording prohibition information indicates whether or not user data is prohibited from being recorded in a specific recording layer among the plurality of the recording layers.

In one embodiment of the invention, only a single recording layer among the plurality of the recording layers may have the layer information region.

In one embodiment of the invention, each of the plurality of the recording layers may have the layer information region.

In one embodiment of the invention, the layer information may include plurality pieces of recording prohibition information, and each of the plurality pieces of the recording prohibition information may indicate whether or not user data is prohibited from being recorded in a corresponding recording layer of the plurality of the recording layers.

In one embodiment of the invention, the layer information may further include authentication information for authenticating an entity having authority to rewrite the recording prohibition information.

In another aspect of the present invention, there is provided an information recording/reproducing device for a rewritable multilayered disc including a plurality of recording layers in which at least one of the plurality of the recording layers has a layer information region in which layer information including a recording prohibition condition indicating whether or not user data is prohibited from being recorded in a specific layer among the plurality of the recording layers is recorded, and the information recording/reproducing device includes: a layer information reproduction section for reproducing the layer information recorded in the layer information region; and a write protection section for determining whether or not user data is prohibited from being recorded in the specific recording layer based on the layer information and deciding whether or not the user data should be recorded in the specific recording layer based on the determination result.

BEST MODE FOR CARRYING OUT THE INVENTION

Hereinafter, embodiments of the present invention will be described with reference to the drawings.

Figure 1A:
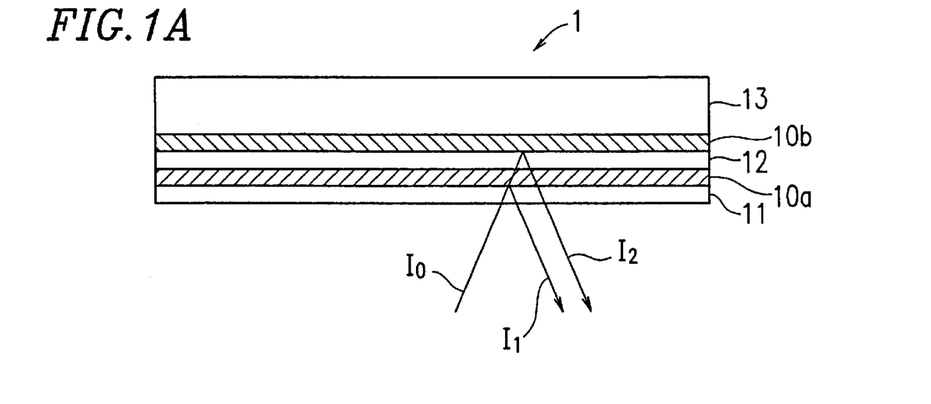
FIG. 1A is a side view illustrating a structure example of a rewritable multilayered disc 1 according to an embodiment of the present invention.

FIG. 1A is a side view illustrating a structure example of a rewritable multilayered disc 1 according to an embodiment of the present invention.

The disc 1 includes: a transparent substrate 11; a recording layer 10a as a first recording layer formed on the transparent substrate 11; a transparent spacer layer 12 formed on the recording layer 10a; a recording layer 10b as a second recording layer formed on the transparent spacer layer 12; and a reflective layer 13 formed on the recording layer 10b.

The structure of the disc 1 is not limited to the structure shown in FIG. 1A. The disc 1 may have any structure as long as it has the recording layer 10a as the first recording layer and the recording layer 10b as the second recording layer. In the descriptions below, an embodiment of the present invention will be described using an example of a rewritable two-layer disc having two recording layers. However, the present invention is not limited to the rewritable two-layer disc. The present invention may be applied to a rewritable N-layer disc having N recording layers, where N is any integer equal to 2 or greater.

The recording layers 10a and 10b are structured such that recording and reproduction can be performed from one of the faces of the disc 1. As shown in FIG. 1A, incident light $I_0$ is reflected by the recording layer 10a and propagates away from the disc 1 as reflected light $I_1$. Similarly, the incident light $I_0$ is also reflected by the recording layer 10b and goes away from the recording layer 10b as reflected light $I_2$.

The disc 1 is designed such that the absorption ratio and the reflectance of the recording layers 10a and 10b are optimum for recording on the disc 1 from one face thereof. Regarding details about physical property of the rewritable multilayered disc, see Proceeding 5aV5 of the 59th scientific lecture meeting of the Japanese Society of Applied Physics.

Figure 1B:
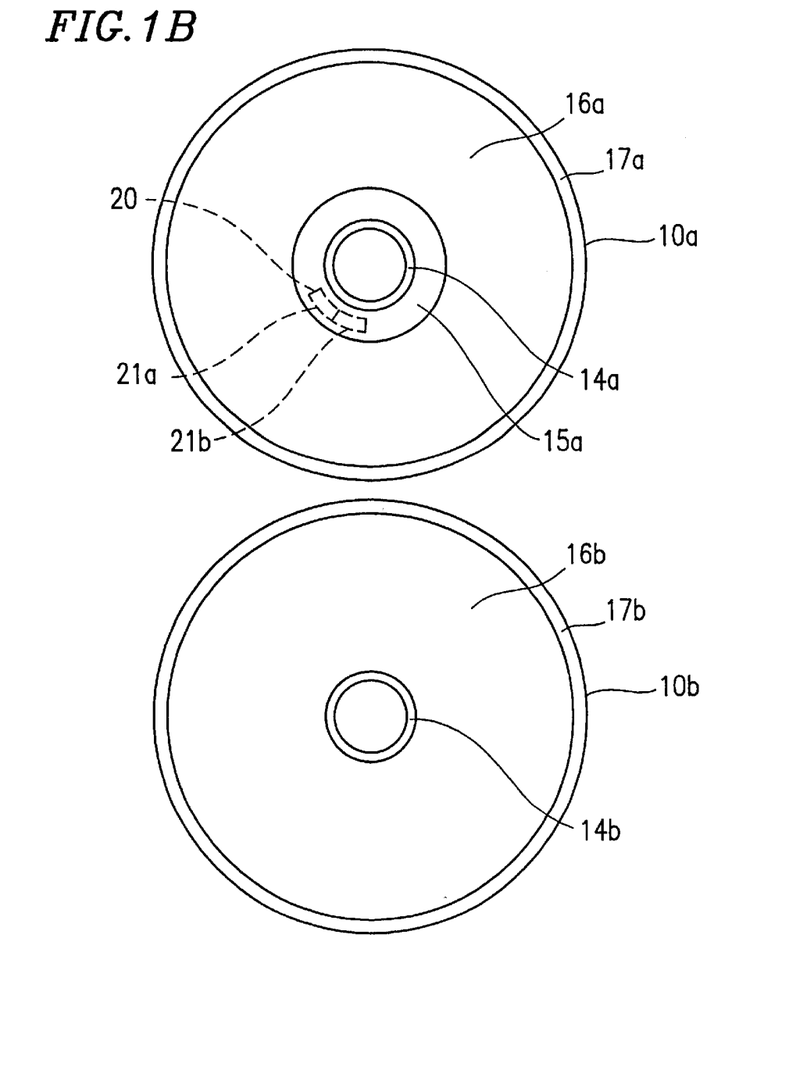
FIG. 1B is a plan view illustrating a structure example of recording layers 10a and 10b.

FIG. 1B is a plan view illustrating a structure example of the recording layers 10a and 10b.

The recording layer 10a includes, from the inner circumference toward the outer circumference of the disc 1, a lead-in region 14a, a layer information region 15a, a user region 16a, and a lead-out region 17a in this order.

The lead-in region 14a is a region in which data is not rewritable. The lead-in region 14a is, for example, a pit region.

The layer information region 15a is a region in which layer information 20 is recorded. The format of the layer information 20 is predetermined. The layer information 20 includes recording prohibition information indicating whether or not user data is prohibited from being recorded in a specific recording layer among the recording layers 10a or 10b included in the disc 1. The layer information 20 includes, for example, recording prohibition information 21a indicating whether or not user data is prohibited from being recorded in the recording layer 10a and recording prohibition information 21b indicating whether or not user data is prohibited from being recorded in the recording layer 10b.

When the layer information 20 includes two bit recording prohibition bits, the recording prohibition information 21a is represented by the first recording prohibition bit (MSB), and the recording prohibition information 21b is represented by the second recording prohibition bit (LSB).

When a value of the first recording prohibition bit is one (true), user data recorded in the recording layer 10a is prohibited from being rewritten. When the value of the first recording prohibition bit is zero (false), the user data recorded in the recording layer 10a is allowed to be rewritten.

When a value of the second recording prohibition bit is one (true), user data recorded in the recording layer 10b is prohibited from being rewritten. When the value of the second recording prohibition bit is zero (false), the user data recorded in the recording layer 10b is allowed to be rewritten.

The user region 16a is a region in which user data is recorded. Any data can be recorded in any location in the user data region 16a by a user (application program, or system) which uses an information recording/reproducing device (disc drive) for performing recording and reproduction on the disc 1.

The access to the user region 16a is restricted by the layer information 20 recorded in the layer information region 15a. On the other hand, basically, access to the layer information region 15a is not restricted by the layer information 20 recorded in the layer information region 15a or by user data recorded in the user region 16a. For example, even when the layer information 20 recorded in the layer information region 15a represents "recording prohibition" on the recording layer 10a, it is possible to rewrite the layer information 20 recorded in the layer information region 15a of the recording layer 10a.

The recording layer 10b includes a lead-in region 14b, a user region 16b, and a lead-out region 17b in this order from the inner circumference toward the outer circumference of the disc 1. In an example shown in FIG. 1B, there is no layer information region formed in the recording layer 10b. The access to the user region 16b is restricted by the layer information 20 recorded in the layer information region 15a of the recording layer 10a.

As described above, among a plurality of recording layers included in the disc 1, the recording prohibition information for all of these recording layers is recorded in only a single recording layer, whereby it is possible to read the recording prohibition information at high speed. This is because only one-time focus control is required for reading the recording prohibition information.

The layer information region 15b may be formed on the recording layer 10b instead of forming the layer information region 15a on the recording layer 10a. In this case, contents of the layer information recorded in the layer information region 15b are the same as those of the layer information 20 recorded in the layer information region 15a.

Figure 1C:
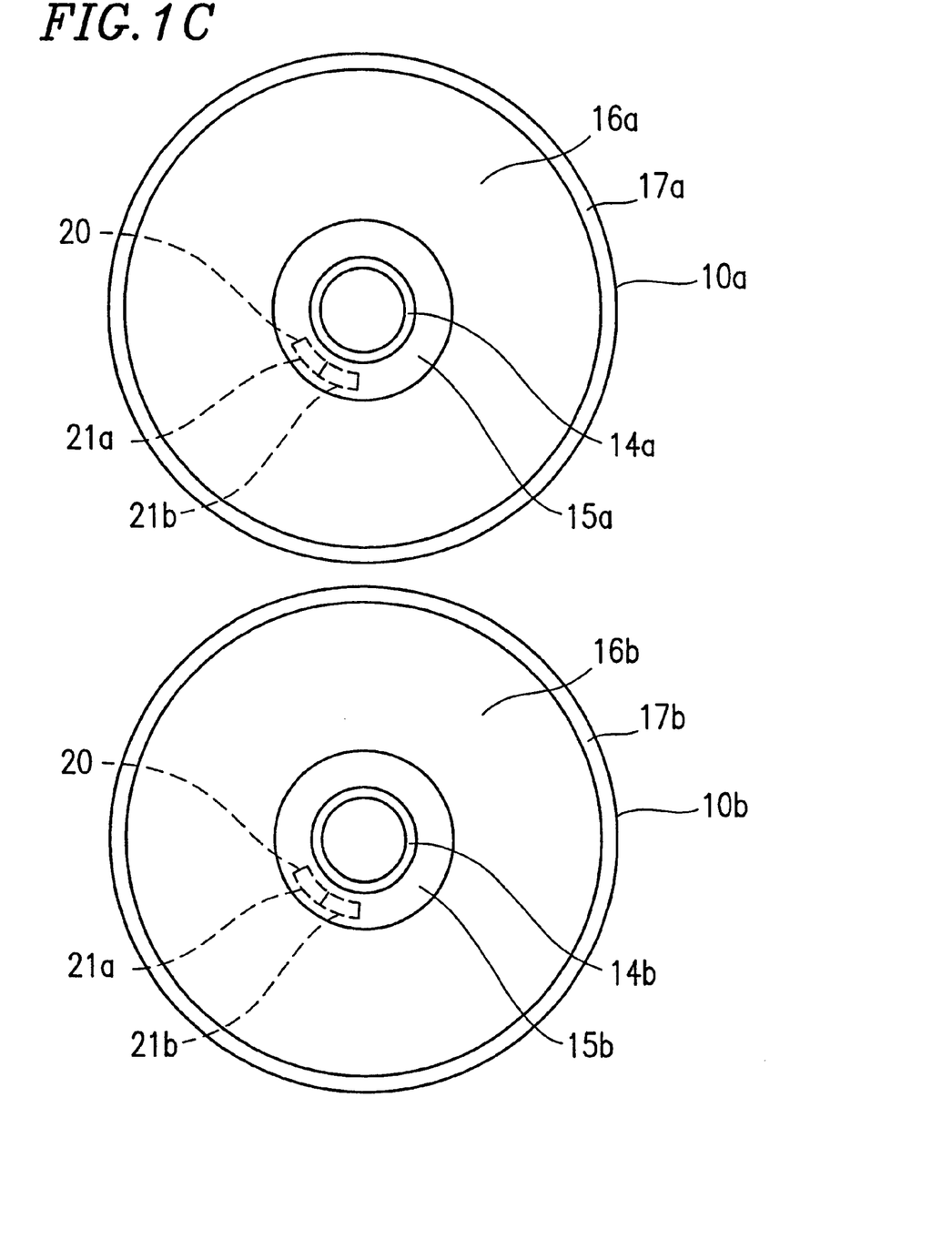
FIG. 1C is a plan view illustrating another structure example of the recording layers 10a and 10b.

FIG. 1C is a plan view illustrating another structure example of the recording layers 10a and 10b.

The structure of the recording layer 10a shown in FIG. 1C is identical to that of the recording layer 10a shown in FIG. 1B, and thus the descriptions thereof are omitted.

The layer information region 15b is formed in the recording layer 10b shown in FIG. 1C. The same information as the layer information 20 recorded in the layer information region 15a of the recording layer 10a is recorded in the layer information region 15b.

As described above, among a plurality of recording layers included in the disc 1, the recording prohibition information for all of the recording layers is recorded in each recording layer, whereby, no matter where in the recording layers a focal position of a light beam exists, it is possible to read recording prohibition information for a recording layer other than a recording layer where the focal position of the light beam exists, without greatly changing the focal position of the light beam. This allows the operation between reception of a request from a user and the recording operation to be performed at high speed. Moreover, it is possible to know that recording in a specific recording layer is prohibited without adjusting the focal position of the light beam to the specific recording layer. This allows the frequency of the access to the specific recording layer to be decreased. As a result, in a system such that the influence of a light beam for reproduction is not negligible (e.g., a system for an optical disc employing a phase shift mode), durability of the optical disc can be increased.

Alternatively, among a plurality of recording layers included in the disc 1, the recording prohibition information for all of the recording layers may be recorded in at least one of the recording layers. Alternatively, recording prohibition information for a specific recording layer may be recorded in a layer information region of the specific recording layer whereas the recording prohibition information for the specific recording layer may not be recorded in a layer information region of a recording layer other than the specific recording layer.

The layer information may include, in addition to the recording prohibition information, authentication information for authenticating an entity having authority to rewrite the recording prohibition information. For example, the layer information may be represented as a structure having members such as recording prohibition bits and authentication information. Alternatively, the layer information may be represented as a list of the structure having members such as recording prohibition bits and authentication information.

By using the authentication information to identify the entity having authority to rewrite the recording prohibition information, the layer information can be allowed to be rewritten on certain conditions. Rewriting of the layer information is restricted in this manner, so that the write protection can be provided to the disc 1 in a more flexible and securer manner. For example, an operating system (OS) may record the authentication information and allow an application program to perform dynamic recording by its decision. Alternatively, when canceling of the recording prohibition is not preferable, the recording prohibition may be locked by using a password so as not to be cancelled.

Each of the recording layers 10b and 10b is divided into a plurality of sectors (not shown). The term "sector" described herein means a unit of data which can be recorded/reproduced in one recording/reproducing operation.

The above-described layer information 20 may be recorded in a sector. Alternatively, the same layer information 20 may be duplicated and recorded in each of the plurality of the sectors. In this manner, by duplicating the layer information 20 and recording the duplicated layer information 20 in the plurality of the sectors, even when any malfunction occurs in one of the sectors in which the layer information 20 is recorded, it is still possible to read the layer information 20 from any sector other than the malfunction sector. As a result, the tolerance for malfunction sectors will be improved.

Each sector in the recording layers 10b and 10b is designated by a sector address. Data is recorded in a sector designated by the sector address, or data recorded in a sector designated by the sector address is reproduced. Each sector in the recording layers 10a and 10b has a preallocated sector address. For example, the sector address may be preallocated to each sector so as not to be duplicated in the disc 1.

Figure 2:
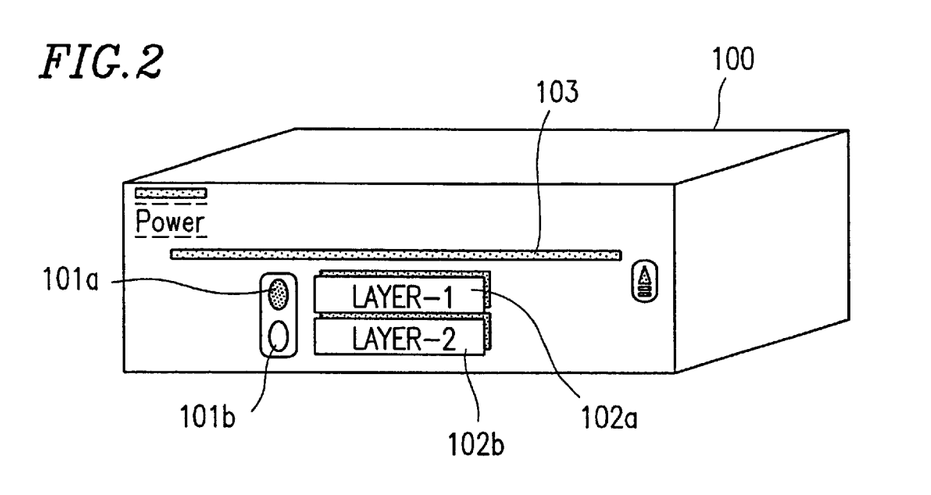
FIG. 2 is an external view of an information recording/reproducing device 100 according to an embodiment of the present invention.

FIG. 2 illustrates an external view of an information recording/reproducing device (disc drive device) 100 according to an embodiment of the present invention. The information recording/reproducing device 100 has a function of recording information in the disc 1 and reproducing information recorded in the disc 1.

As shown in FIG. 2, the information recording/reproducing device 100 includes indicators 101a and 101b for indicating recording prohibition information recorded in the disc 1, switches 102a and 102b used for rewriting the recording prohibition information, and a slot section 103 for inserting the disc 1 therein. The indicators 101a and 101b are, for example, light emitting diodes (LED). The switches 102a and 102b are, for example, toggle switches.

The indicator 101a indicates recording prohibition information for the recording layer 10a of the disc 1. For example, the indicator 101a is lit up when data is prohibited from being recorded in the recording layer 10a, whereas the indicator 101a is turned off when data is allowed to be recorded in the recording layer 10a. Similarly, the indicator 101b indicates recording prohibition information for the recording layer 10b of the disc 1.

The switch 102a is used for rewriting the recording prohibition information for the recording layer 10b of the disc 1. For example, when the switch 102a is turned on, the recording prohibition information is rewritten so that data is prohibited from being recorded in the recording layer 10a and when the switch 102a is turned off, the recording prohibition information is rewritten so that data is allowed to be recorded in the recording layer 10b. Similarly, the switch 102b is used for rewriting the recording prohibition information for the recording layer 10b of the disc 1.

Figure 3:
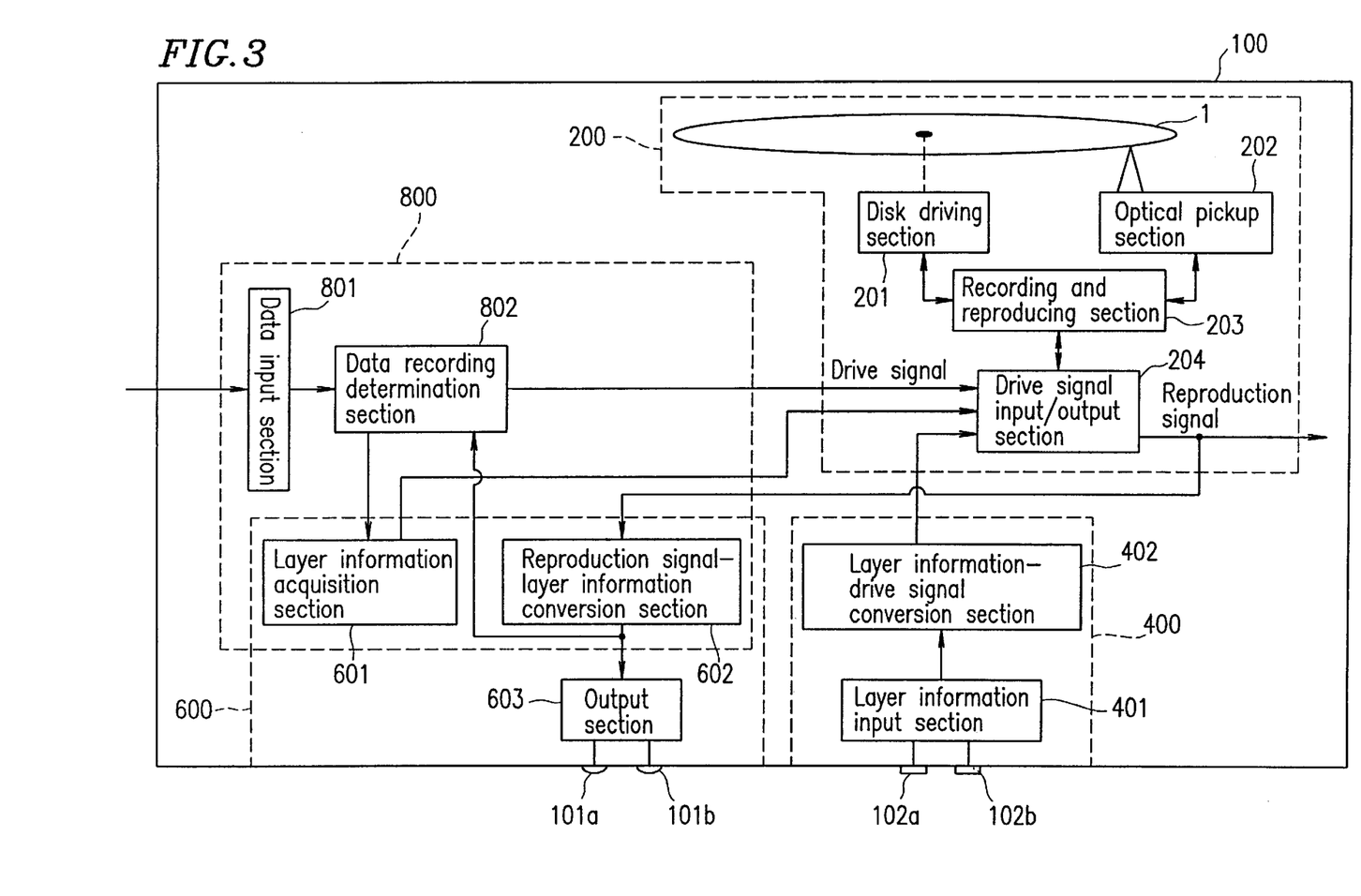
FIG. 3 is a functional block diagram illustrating a structure of the information recording/reproducing device 100 shown in FIG. 2.

FIG. 3 illustrates a structure of the information recording/reproducing device 100 shown in FIG. 2. The information recording/reproducing device 100 includes: a disc drive section 200 for controlling the recording and reproducing of data in the disc 1; a layer information recording section 400 for recording layer information in the disc 1; a layer information reproducing section 600 for reproducing layer information recorded in the disc 1; and a write protection section 800 for determining based on the layer information whether or not user data is prohibited from being recorded in a specific recording layer in the disc 1 and for deciding based on the determination result whether or not the user data should be recorded in the specific recording layer.

Functions of each of the sections may be implemented by software (firmware) or may be implemented by hardware. Alternatively, a part of the function of the sections may be implemented by software (firmware) and other parts may be implemented by hardware.

Hereinafter, the function and operation of each section will be described in detail.

In the first place, function and operation of the disc drive section 200 are described with reference to FIGS. 3 and 4.

As shown in FIG. 3, the disc drive section 200 includes a disc driving section 201, an optical pickup section 202, a recording and reproducing section 203 for controlling the disc driving section 201 and the optical pickup section 202, and drive signal input/output section 204.

The disc driving section 201 includes a motor (not shown) for rotating the disc 1 and a mechanism (not shown) for controlling the motor. The optical pickup section 202 includes optical components (not shown) such as a semiconductor laser and a light receiving element, and an actuator (not shown).

Figure 4:
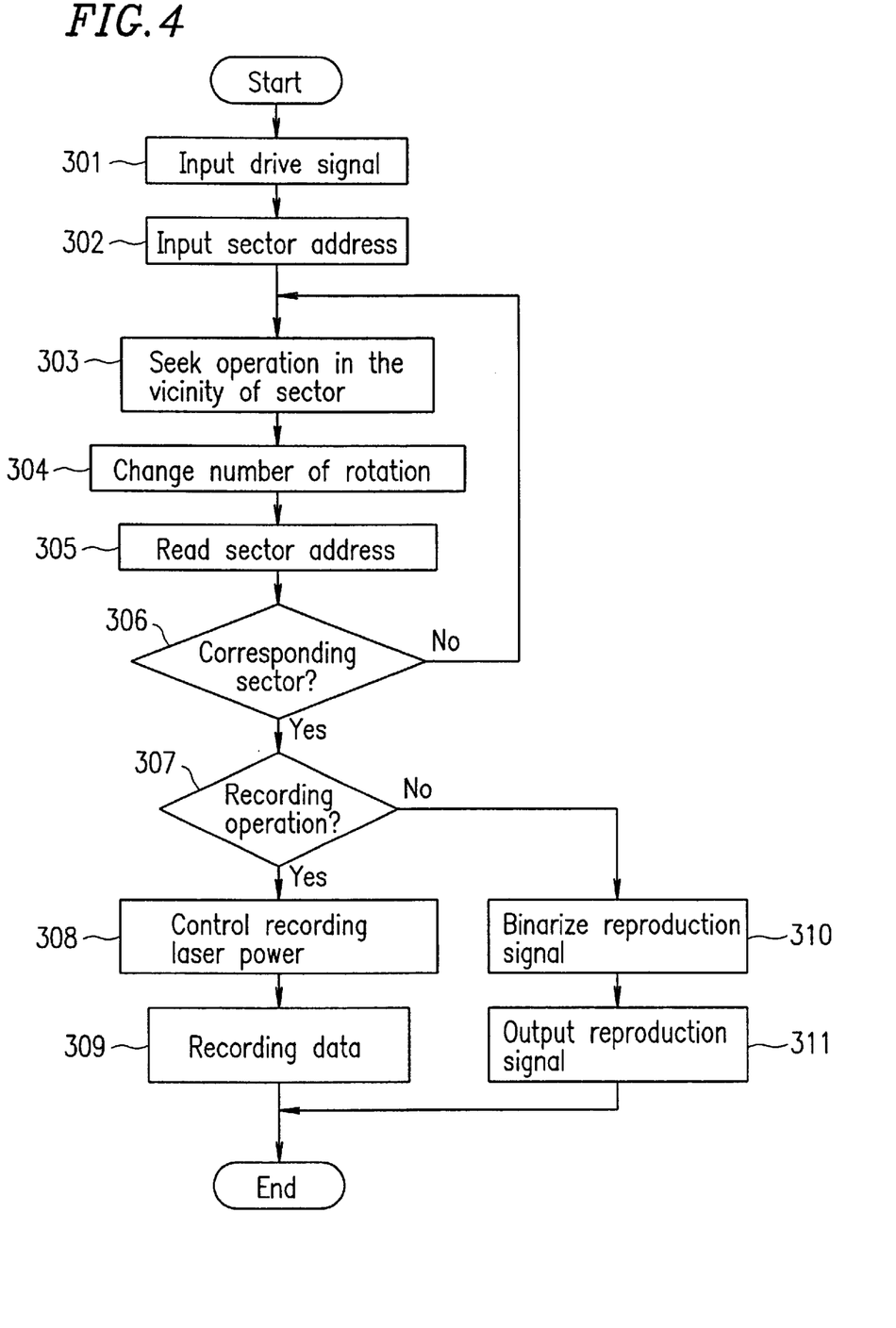
FIG. 4 is a flowchart illustrating an operation procedure of a disc drive section 200.

FIG. 4 illustrates an operation procedure of the disc drive section 200.

At step 301, a drive signal is input to the drive signal input/output section 204. The drive signal is input the drive signal input/output section 204 in a manner conforming to a communication method used by the drive signal input/output section 204. The term "drive signal" described herein means digital data required for operating the disc drive section 200. The drive signal includes a sector address designating a sector to be accessed and information designating either of a recording operation or a reproducing operation. When the recording operation is designated, the drive signal further includes digital data to be recorded in the disc 1.

The digital data to be recorded in the disc 1 may be data encoded for error correction or may be data scrambled to improve maintainability.

A recording layer in the disc 1 which is to be accessed may be specified by a sector address or may be specified by a command for specifying the recording layer in the disc 1 which is to be accessed. Such a command may be input to the drive signal input/output section 204 apart from the sector address.

At step 302, the drive signal input/output section 204 inputs the sector address to the recording and reproducing control section 203.

At step 303, the recording and reproducing control section 203 makes the optical pickup section 202 perform a seek operation to move to the vicinity of the sector designated by the sector address. In this seek operation, if necessary, a focal position of a light beam emitted to the disc 1 is changed (caused to jump) from one recording layer to another recording layer.

At step 304, the recording and reproducing control section 203 controls the disc driving section 201 so as to change the number of rotations of the disc 1 to a proper value.

At step 305, the recording and reproducing section 203 receives a reproduction signal from the light pickup section 202 and reads a sector address from the reproduction signal.

At step 306, the recording and reproducing control section 203 determines whether or not it indicates a corresponding sector (i.e., whether or not the sector address read at step 305 matches the sector address designated by the drive signal). When the determination at step 306 is "YES", the process proceeds to step 307. When the determination at step 306 is "NO", the process returns to step 303 and the seek operation continues.

At step 307, the recording and reproducing control section 203 receives from the drive signal input/output section 204 information designating either of a recording operation or a reproducing operation and causes the process to branch based on the information. When the recording operation is designated, the process proceeds to step 308. When the reproducing is designated, the process proceeds to step 310.

At step 308, the recording and reproducing control section 203 outputs to the optical pickup section 202 a recording laser power control signal for controlling the power of a laser used for recording data.

At step 309, the optical pickup section 202 makes the laser emit light according to the recording laser power control signal, thereby recording the data in the disc 1.

At step 310, the recording and reproducing control section 203 receives an analog reproduction signal from the optical pickup section 202 and binarizes the analog reproduction signal.

At step 311, the recording and reproducing control section 203 outputs the binarized reproduction signal via the drive signal input/output section 204.

Next, the function and operation of the layer information recording section 400 are described with reference to FIGS. 3 and 5.

As shown in FIG. 3, the layer information recording section 400 includes a layer information input section 401 and a layer information-drive signal conversion section 402. The layer information input section 401 is connected to the switches 102a and 102b.

Figure 5:
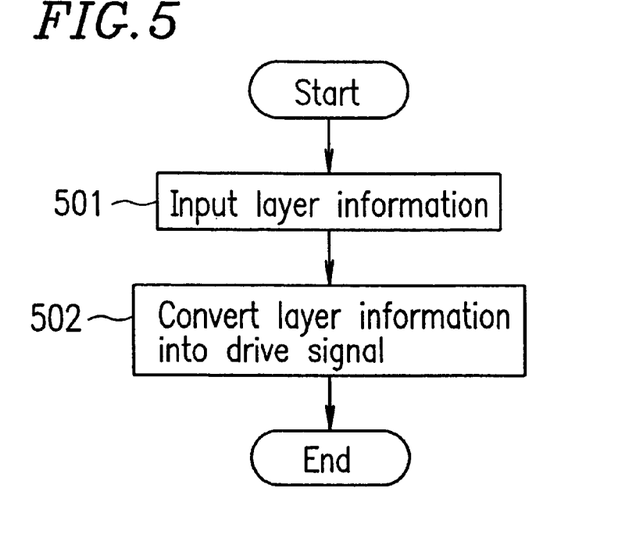
FIG. 5 is a flowchart illustrating an operation procedure of a layer information recording section 400.

FIG. 5 illustrates an operation procedure of the layer information recording section 400.

At step 501, layer information is input to the layer information input section 401. For example, when the switch 101a is on and the switch 101b is off, two-bit data (1-0; MSB-LSB) is input to the layer information input section 401 as the layer information. A value of a first bit (MSB) of the two-bit data is one, and a value of a second bit (LSB) of the two-bit data is zero. This means that the recording layer 10b of the disc 1 is write-protected and the recording layer 10b of the disc 1 is not writeprotected.

At step 502, the layer information-drive signal conversion section 402 receives the layer information from the layer information input section 401 and converts the layer information into a drive signal. The drive signal is generated so as to operate the disc drive section 200 such that the layer information is recorded in a layer information region of the disc 1. For example, the drive signal includes a sector address of the layer information region of the disc 1, information designating the recording operation, and the layer information to be recorded in the layer information region of the disc 1. The drive signal is output to the drive signal input/output section 204 of the disc drive section 200.

Next, the function and operation of the layer information reproducing section 600 are described with reference to FIGS. 3 and 6.

As shown in FIG. 3, the layer information reproducing section 600 includes a layer information acquisition section 601, a reproduction signal-layer information conversion section 602, and an output section 603. The output section 603 is connected to the indicators 101a and 101b.

Figure 6:
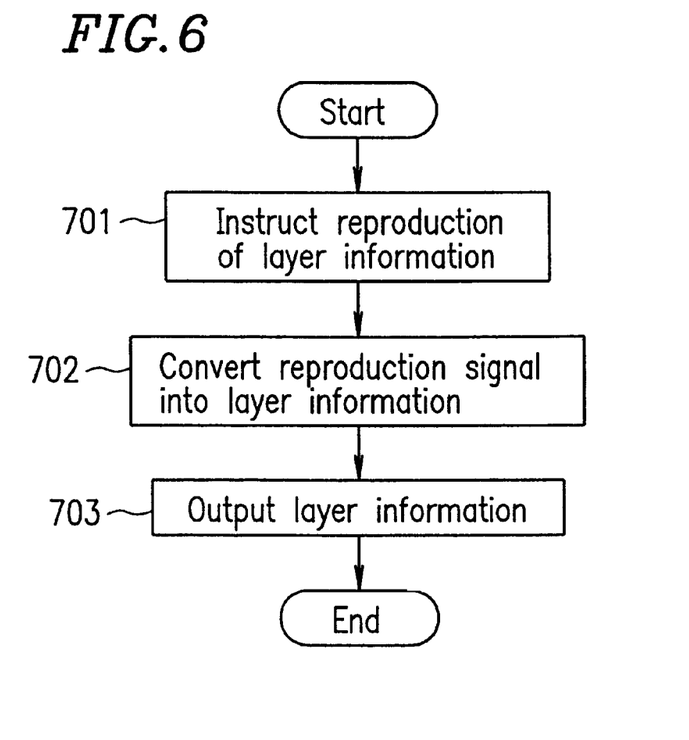
FIG. 6 is a flowchart illustrating an operation procedure of a layer information reproducing section 600.

FIG. 6 illustrates an operation procedure of the layer information reproducing section 600. Reproduction of layer information is started in response to loading of the disc 1 or in response to a start command from a user.

At step 701, the layer information acquisition section 601 instructs the disc drive section 200 to reproduce the layer information recorded in the disc 1. This instruction is carried out by, for example, outputting a drive signal including a sector address of the layer information region of the disc 1 and information designating the reproducing operation to the drive signal input/output section 204 of the disc drive 200.

At step 702, the reproduction signal-layer information conversion section 602 receives a reproduction signal output from the drive signal input/output section 204 and converts the reproduction signal into layer information.

At step 703, the output section 603 outputs the layer information. For example, the layer information section is indicated by the indicators 101a and 101b connected to the output section 603. An output device such as a monitor may be connected to the output section 603.

An inspection device having the disc drive section 200 and the layer information reproduction section 600 may be used for inspecting the disc 1 before the disc 1 is shipped.

Next, the function and operation of the write protection section 800 are described with reference to FIGS. 3 and 7.

As shown in FIG. 3, the write protection section 800 includes a data input section 801, a data recording determination section 802, the layer information acquisition section 601, and the reproduction signal-layer information conversion section 602. The layer information acquisition section 601 and the reproduction signal-layer information conversion section 602 of the write protection section 800 are components common to the layer information reproduction section 600.

Figure 7:
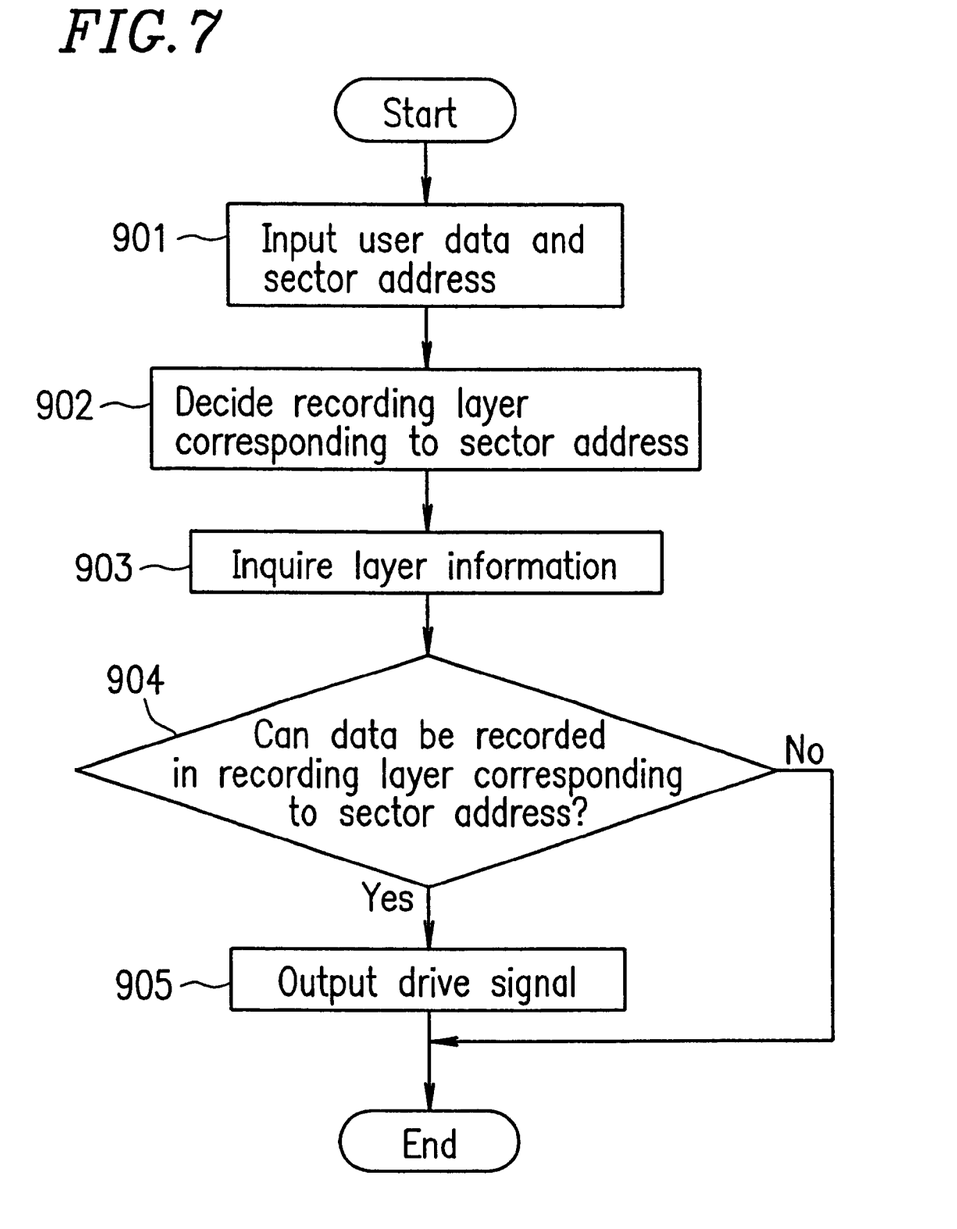
FIG. 7 is a flowchart illustrating an operation procedure of a write protection section 800.

FIG. 7 illustrates an operation procedure of the write protection section 800.

At step 901, data (user data) to be recorded in the disc 1 and a sector address indicating a position in the disc 1 where the user data should be recorded are input to the data recording determination section 802 via the data input section 801. The data input section 801 is connected to a computer (not shown) provided outside the information recording/reproducing device 100.

At step 902, the data recording determination section 802 determines which one of the plurality of the recording layers included in the disc 1 corresponds to the input sector address. The correspondence between the sector addresses of the disc 1 and the recording layers of the disc 1 is predetermined. For example, the data recording determination section 802 refers to a table representing the correspondence so as to determine a recording layer corresponding to the input sector address.

At step 903, the data recording determination section 802 inquires layer information including recording prohibition information for the recording layer which corresponds to the input sector address, before instructing the disc drive section 200 to record the user data in the disc 1. Such an inquiry is achieved by, for example, instructing the layer information acquisition section 601 to reproduce the layer information so as to acquire the layer information output from the reproduction signal-layer information conversion section 602.

At step 904, the data recording determination section 802 determines whether or not the user data can be recorded in the disc 1 based on the acquired layer information.

When the acquired layer information indicates that the user data is prohibited from being recorded in the recording layer corresponding to the sector address, the determination at step 904 is "No". In this case, the data recording determination section 802 ends the process without recording the user data in the disc 1.

When the acquired layer information indicates that the user data is allowed to be recorded in the recording layer corresponding to the sector address, the determination at step 904 is "Yes". In this case, the process proceeds to step 905.

At step 905, the data recording determination section 802 outputs to the drive signal input/output section 204 a drive signal instructing the disc drive section 200 to record the user data in the disc 1. The drive signal includes, for example, the sector address input to the data recording determination section 802, information designating the recording operation, and the user data input to the data recording determination section 802.

It is also possible to structure an information recording/reproducing device which does not have a function of rewriting layer information recorded in the disc 1. Such an information recording/reproducing device is not required to include the layer information recording section 400 shown in FIG. 3, and only necessary to include the disc drive section 200, the layer information reproduction section 600, and the write protection section 800 shown in FIG. 3.

As described above, according to the rewritable multilayered disc of the present invention, it is possible to separately write-protect each of the plurality of the recording layers. Such protection for each layer cannot be implemented in a single layer disc.

For example, assume a case where important data is recorded in a specific recording layer in a multilayered disc, and the recording operation in the specific recording layer is prohibited using layer information. In this case, a user is supposed to perform the recording operation in a recording layer other than the specific recording layer. Even if malfunction such as track slipping occurs during the recording operation, there is less possibility that the important data recorded in the specific recording layer is affected by such malfunction. Thus, it is possible to improve maintainability of the important data against malfunction such as track slipping. As a result, managing the important data and ordinary data in the same disc is achieved with ease.

Figure 8:
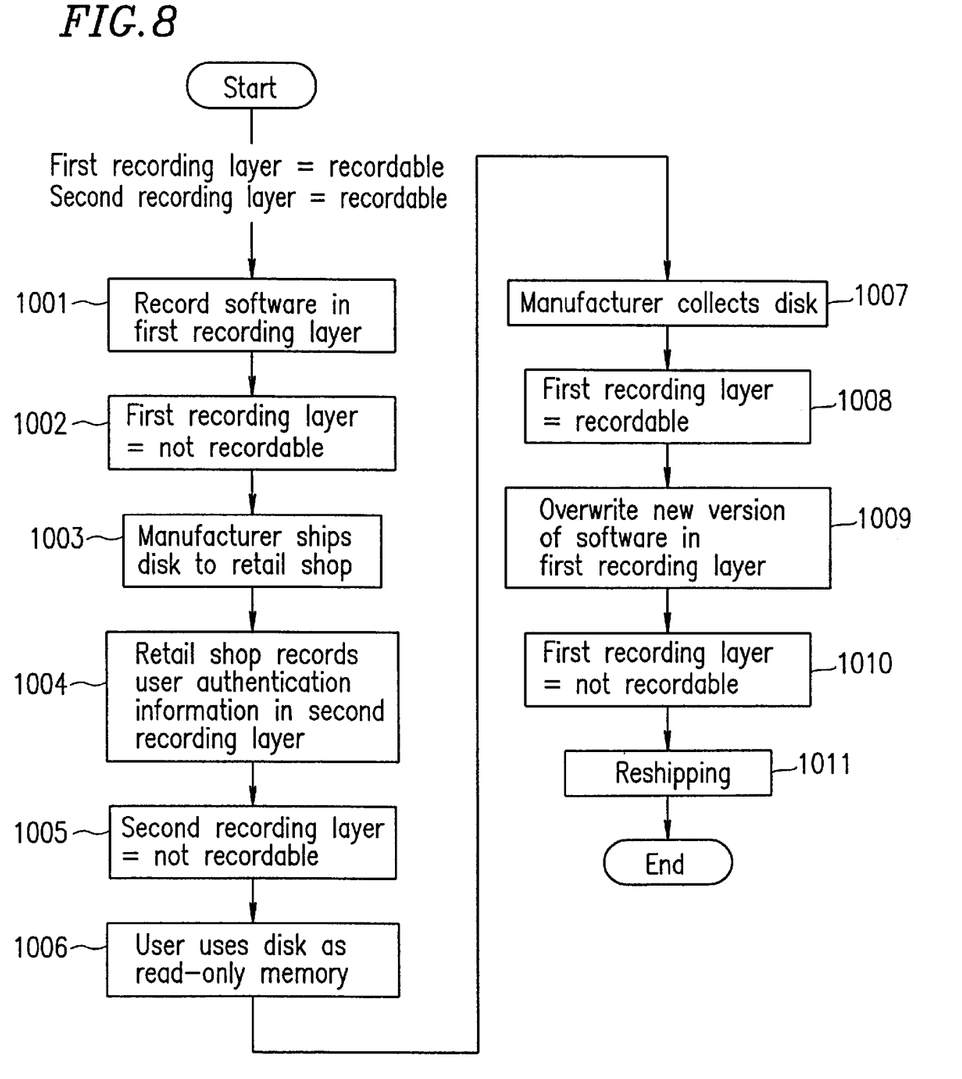
FIG. 8 is a diagram illustrating an example of utilization of the rewritable multilayered disc 1.

FIG. 8 illustrates an example of utilization of the rewritable multilayered disc 1.

In the initial setting of the disc 1, it is assumed that data is allowed to be recorded in the recording layer 10*a* (first recording layer) and the recording layer 10*b* (second recording layer). That is, the first recording layer is recordable, and the second recording layer is also recordable.

At step 1001, the manufacturer records software (e.g., commercial software) in the first recording layer of the disc 1.

At step 1002, the manufacturer rewrites layer information so as to prohibit data from being recorded in the first recording layer of the disc 1. As a result, the first recording layer is not recordable and the second recording layer is recordable. Such rewriting of the layer information may be performed by, for example, using the information recording/reproducing device 100.

Alternatively, the layer information can be rewritten by using a layer information recording/reproducing device exclusively used for rewriting layer information. The layer information recording/reproducing device exclusively used for rewriting layer information is not required to include the layer information reproduction section 600 and the write protection section 800 shown in FIG. 3, but only necessary to include disc drive section 200 and the layer information recording section 400 shown in FIG. 3.

At step 1003, the manufacturer ships the disc 1 to a retail shop.

At step 1004, before selling the disc 1 to a user, the retail shop records in the second recording layer user authentication information required for authenticating the user.

At step 1005, the retail shop rewrites the layer information so as to prohibit data from being recorded in the second recording layer of the disc 1. As a result, the first recording layer is not recordable, and the second recording layer is not recordable.

At step 1006, the user uses the disc 1 as a read-only memory. A reproducing device for reproducing the disc 1 has a user authentication system. The user authentication system requires the user to input the user authentication information before loading the software recorded in the disc 1. The user authentication system determines whether or not the user authentication information which is input by the user matches the user authentication information recorded by the retail shop in the disc 1. When these two pieces of the user authentication information match each other, the user authentication system allows the user to use the software recorded in the disc 1.

As described above, by using the rewritable multilayered disc 1, the retail shop can record the user authentication information in the recording layer which is different from the recording layer in which the software is recorded by the manufacturer. This can avoid a risk of mistakenly erasing the software recorded in the disc 1 when the retail shop records the user authentication information in the disc 1. Moreover, even if malfunction such as track slipping occurs when the retail shop is at work on recording the user information in the disc 1, there is less possibility that the recording layer in which the software is recorded is affected by such malfunction.

Recording in all recording layers of the disc 1 is prohibited before the disc 1 is sold to the user. This can avoid a risk that the software or the user authentication information recorded in the disc 1 is mistakenly erased by the user.

At step 1007, the manufacturer collects the disc 1 from the user in order to upgrade the software recorded in the disc 1.

At step 1008, the manufacturer rewrites the layer information so as to allow data to be recorded in the first recording layer of the disc 1. As a result, the first recording layer is recordable and the second recording layer is not recordable.

At step 1009, the manufacturer writes a new version of the software over the old version of the software in the first recording layer of the disc 1.

At step 1010, the manufacturer rewrites the layer information so as to prohibit data from being recorded in the first recording layer of the disc 1. As a result, the first recording layer is not recordable and the second recording layer is not recordable.

At step 1011, the manufacturer reships the disc 1.

As described above, by using the rewritable multilayered disc 1, the manufacturer can write the new version of the software over the old version of the software in the recording layer which is different from the recording layer in which the user authentication information is recorded by the retail shop. This can avoid a risk that the user authentication information recorded in the disc 1 is mistakenly erased by the manufacturer when the new version of the software is written over the old version of the software in the disc 1.

As described above, the software can be upgraded in the same disc. This cannot be implemented in a disc which is not rewritable such as a CD-ROM.

Instead of the manufacturer which collects the disc 1 from the user, the user may download installer software and the new version of the software to a terminal via a network such as the Internet. In this case, the layer information of the disc 1 is rewritten by the downloaded installer software. The installer software installs the new version of the software in the disc 1 after rewriting the layer information so as to allow data to be recorded in the first layer of the disc 1 (i.e., the first recording layer is recordable). After that, the installer software rewrites the layer information again so as to prohibit data from being recorded in the first recording layer of the disc 1 (i.e., the first recording layer is not recordable). Such rewriting of the layer information may be performed, for example, by using the information recording/reproducing device 100.

The rewritable multilayered disc 1 can be used in various cases. For example, when more than one person share the same disc 1, data is prohibited from being recorded in the same recording layer of the disc 1 by more than one person, or the disc 1 is write-protected by providing an authentication system which identifies application programs to be prohibited from being recorded. Thus, the disc 1 can be used in more flexible manner.

(1) For example, when more than one person share the same disc, in many cases, it is necessary to prevent operation performed in one region from affecting the other region. If anything, when malfunction occurs during the operation performed in one region, the other region should be prevented from being damaged. One typical example is a case where a parent and a child share one disc. There is a need for restraining the child from accessing the contents included in a region used by the parent, or there is a need for avoiding a problem such that the disc is mistakenly formatted by the child.

Assume that a rewritable two-layer disc having a first recording layer and a second recording layer is used by a user A and a user B. The first and second recording layers are respectively divided into a plurality of sectors, sector addresses which are serial numbers through the first and second recording layers are allocated to each sector in the first and second recording layers. The user A is authorized to access a region A, and the user B is authorized to use a region B.

In order to implement such authorization for each user, for example, there is a method for defining a group of sectors in which there is a file system for managing all sectors in the disc as a volume for the user A and defining another group of sectors as a volume for the user B.

In the case where malfunction such as track slipping occurs while recording data in a sector, there is a possibility that other sectors in the same recording layer are damaged. Accordingly, in order to prevent the malfunction occurred while the region A is used by the user A from affecting the region B, it is preferable that each of the sectors is allocated so as to correspond to a segment of the recording layer. That is, it is preferable to use a file system which can establish access authority for a unit of the recording layer.

The case where the user A desires to use the region A in a logical format which is different from that of the region B can also be considered. In this case, in order to prevent the region B for the user B from being mistakenly formatted by formatter software which logically formats a disc, the region B is required to be individually write-protected apart from the user region which can be logically formatted.

(2) When the manufacturer uses a rewritable disc for distributing software, the same distributed disc is collected and an old version of the software is erased therefrom, or an old version of the software is erased from the same distributed disc via a network, whereby, a new version of the software can be installed in the same disc. However, in the case where the software is distributed with the rewritable disc, there is a risk of mistakenly erasing data.

By using the rewritable multilayered disc, it is possible to implement write protection for each layer. As a result, the software can be upgraded in the same disc without involving a risk of mistakenly erasing data.

As described above, by performing upgrade service to the same disc, users will not possess different versions of software. Thus, user can avoid misuse of the software, and the manufacturer can have the advantage of performing user support more securely. Moreover, in comparison to a conventional operation method in which an old disc is collected and a new disc is supplied, consumption of discs can be reduced. This leads to implementation of an ecofriendly recycling society.

(3) In a host computer, called a home server, of a domestic LAN, all equipment is controlled in parallel. Thus, there can be a case where a plurality of application programs share the same disc. However, it is expected that frequency in access to the disc is diverse among the application programs.

In a phase shift type optical disc such as a DVD-RAM, it is known that a recording layer is damaged when the disc is reproduced. Accordingly, when one disc is used by two types of application programs, and frequency in use of the disc between the application programs is extremely different, it is preferable that a seek operation for accessing a region which is used more frequently does not affect a region which is used less frequently.

For example, in a real-time recording and reproducing system for moving pictures, a region in which storing and erasing of cache data are repeated and a storage region of a system (kernel) are different in so far as a frequency of being accessed. The former repeats recording and reproducing over and over during picture recording, whereas the latter completes its operation after loading DRAM at the startup of the system.

The reliability may be occasionally diverse for each application program. The reliability of an application program under development is particularly low. When the same memory is shared and used by the plurality of the application programs, a system in which all components are caused to be down when malfunction occurs in one component lacks maintainability. A memory protection function among application programs in a DRAM is a basic function provided to an up-to-date OS such as UNIX. However, there is no precedent for such a protection function in the rewritable disc which has portability and is expected to be used in a plurality of systems. Accordingly, when durability for each recording layer causes a problem, it is important to provide the memory protection function among application programs in consideration of the segments of the recording layer.

As the capacity of a medium becomes larger, and a technique for compressing digital contents is improved, application programs which use a single medium in different systems for many purposes are expected to be increased. The importance of mutual protection of a memory in a disc shared by a plurality of users or a plurality of application programs (systems) is expected to be greater in the future. For the purpose of the rewritable multilayered disc, it is useful to establish access authority for each layer in consideration of the memory protection.

INDUSTRIAL APPLICABILITY

According to a rewritable multilayered disc of the present invention, a layer information region is provided in at least one of a plurality of recording layers. In the layer information region, layer information including recording prohibition information which indicates whether or not user data is prohibited from being recorded in a specific recording layer of the plurality of the recording layers may be recorded. This allows the specific recording layer among the plurality of the recording layers to be write-protected.

What is claimed is:

1. A rewritable multilayered disc having a plurality of recording layers, wherein
at least one of the plurality of the recording layers has a layer information region for recording layer information which includes recording prohibition information, and
the recording prohibition information indicates whether or not user data is prohibited from being recorded in a specific recording layer among the plurality of the recording layers.

2. A rewritable multilayered disc according to claim 1, wherein only a single recording layer among the plurality of the recording layers has the layer information region.

3. A rewritable multilayered disc according to claim 1, wherein each of the plurality of the recording layers has the layer information region.

4. A rewritable multilayered disc according to claim 1, wherein the layer information includes plurality pieces of recording prohibition information, and each of the plurality pieces of the recording prohibition information indicates whether or not user data is prohibited from being recorded in a corresponding recording layer of the plurality of the recording layers.

5. A rewritable multilayered disc according to claim 1, wherein the layer information further includes authentication information for authenticating an entity having authority to rewrite the recording prohibition information.

6. An information recording/reproducing device for a rewritable multilayered disc including a plurality of recording layers, wherein
at least one of the plurality of the recording layers has a layer information region in which layer information including a recording prohibition condition indicating whether or not user data is prohibited from being recorded in a specific layer among the plurality of the recording layers is recorded, and
the information recording/reproducing device includes:
a layer information reproduction section for reproducing the layer information recorded in the layer information region; and
a write protection section for determining whether or not user data is prohibited from being recorded in the specific recording layer based on the layer information and deciding whether or not the user data should be recorded in the specific recording layer based on the determination result.

* * * * *

UNITED STATES PATENT AND TRADEMARK OFFICE
CERTIFICATE OF CORRECTION

PATENT NO.   : 6,633,535 B1
DATED        : October 14, 2003
INVENTOR(S)  : Shin Asada It is certified that error appears in the above-identified patent and that said Letters Patent is hereby corrected as shown below:

Column 14,
Line 13, "plurality pieces" should read -- a plurality of pieces --.
Line 14, "plurality" should read -- plurality of --.

Signed and Sealed this

Thirtieth Day of December, 2003

JAMES E. ROGAN
*Director of the United States Patent and Trademark Office*